(12) United States Patent
Takizawa et al.

(10) Patent No.: US 11,934,621 B2
(45) Date of Patent: Mar. 19, 2024

(54) INPUT DEVICE

(71) Applicant: Panasonic Intellectual Property Management Co., Ltd., Osaka (JP)

(72) Inventors: Yasuhira Takizawa, Osaka (JP); Yuki Hirata, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/767,267

(22) PCT Filed: Sep. 28, 2020

(86) PCT No.: PCT/JP2020/036612
§ 371 (c)(1),
(2) Date: Apr. 7, 2022

(87) PCT Pub. No.: WO2021/070660
PCT Pub. Date: Apr. 15, 2021

(65) Prior Publication Data
US 2022/0374104 A1    Nov. 24, 2022

(30) Foreign Application Priority Data
Oct. 10, 2019    (JP) .................................. 2019-187180

(51) Int. Cl.
*G06F 3/044*    (2006.01)
*H01H 13/48*    (2006.01)

(52) U.S. Cl.
CPC .......... *G06F 3/0448* (2019.05); *H01H 13/48* (2013.01)

(58) Field of Classification Search
CPC ..... G06F 3/0448; G06F 3/0414; H01H 13/48; H01H 2215/006; H01H 2215/03; H01H 2239/006; H01H 13/52; H01H 13/26
See application file for complete search history.

(56) References Cited

U.S. PATENT DOCUMENTS 9,786,453 B2 * 10/2017 Takano .................. H01H 19/11
10,162,425 B2 * 12/2018 Nakamura ............. H01H 13/78
10,566,151 B1 * 2/2020 Wang ................. H03K 17/9625
(Continued)

FOREIGN PATENT DOCUMENTS

| CN | 106024470 A | 10/2016 |
|---|---|---|
| JP | 2007-280616 A | 10/2007 |

(Continued)

OTHER PUBLICATIONS

International Search Report dated Dec. 1, 2020 issued in International Patent Application No. PCT/JP2020/036612, with English translation.

(Continued)

*Primary Examiner* — William Lu
(74) *Attorney, Agent, or Firm* — Rimon P.C.

(57) ABSTRACT

An input device includes a fixed electrode, a movable electrode, and a movable member. The movable member is configured to elastically deform by receiving pressing force to relatively displace the movable electrode toward the fixed electrode. The movable member has an outer peripheral part. The outer peripheral part includes a suppression structure configured to suppress the movable member from being elastically deformed by the pressing force.

14 Claims, 14 Drawing Sheets

(56) References Cited

U.S. PATENT DOCUMENTS

| | | | | |
|---|---|---|---|---|
| 10,886,082 B1* | 1/2021 | Wang | ............... | H01H 13/83 |
| 10,976,927 B2* | 4/2021 | Tateoka | ............... | G06F 3/04886 |
| 2001/0030116 A1* | 10/2001 | Ohashi | ............... | H01H 15/06 |
| | | | | 200/302.1 |
| 2002/0056611 A1* | 5/2002 | Oba | ............... | H01H 25/06 |
| | | | | 200/4 |
| 2002/0130024 A1* | 9/2002 | Kawaguchi | ............... | H01H 13/702 |
| | | | | 200/512 |
| 2003/0116419 A1* | 6/2003 | Anzai | ............... | H01H 13/7006 |
| | | | | 200/530 |
| 2003/0221943 A1* | 12/2003 | Masuda | ............... | H01H 13/48 |
| | | | | 200/406 |
| 2003/0222660 A1* | 12/2003 | Morimoto | ............... | G01L 1/142 |
| | | | | 324/661 |
| 2008/0164133 A1* | 7/2008 | Hayafune | ............... | H01H 13/48 |
| | | | | 200/516 |
| 2009/0079698 A1* | 3/2009 | Takashima | ............... | G06F 3/038 |
| | | | | 345/169 |
| 2009/0207054 A1* | 8/2009 | Rak | ............... | G06F 3/023 |
| | | | | 341/34 |
| 2009/0219259 A1* | 9/2009 | Kwon | ............... | G06F 3/0445 |
| | | | | 345/173 |
| 2010/0079309 A1* | 4/2010 | Filson | ............... | G06F 3/0219 |
| | | | | 341/20 |
| 2010/0141410 A1* | 6/2010 | Aono | ............... | G06F 3/016 |
| | | | | 345/173 |
| 2011/0241442 A1* | 10/2011 | Mittleman | ............... | H03K 17/975 |
| | | | | 29/622 |
| 2012/0031744 A1* | 2/2012 | Naito | ............... | H01H 59/0009 |
| | | | | 200/181 |
| 2012/0086635 A1* | 4/2012 | Park | ............... | G06F 3/03548 |
| | | | | 345/157 |
| 2012/0206248 A1* | 8/2012 | Biggs | ............... | H10N 30/063 |
| | | | | 156/70 |
| 2014/0311882 A1* | 10/2014 | Terashita | ............... | H01H 13/14 |
| | | | | 200/520 |
| 2016/0172129 A1* | 6/2016 | Zercoe | ............... | H01H 13/803 |
| | | | | 200/5 A |
| 2016/0203710 A1* | 7/2016 | Bataillou | ............... | G08C 19/28 |
| | | | | 340/12.55 |
| 2019/0027324 A1* | 1/2019 | Doro | ............... | H01H 13/06 |
| 2021/0099676 A1* | 4/2021 | England | ............... | H04N 23/90 |
| 2021/0125800 A1* | 4/2021 | Otaka | ............... | H01H 13/06 |

FOREIGN PATENT DOCUMENTS

| | | | |
|---|---|---|---|
| JP | 2012-238483 A | 12/2012 |
| JP | 2017-123229 A | 7/2017 |
| JP | 2018-006264 A | 1/2018 |
| WO | 2017/154694 A1 | 9/2017 |

OTHER PUBLICATIONS

Chinese Office Action and Search Report dated Jan. 4, 2024 issued in the corresponding Chinese Patent Application No. 202080067310.9, with English machine translation of Office Action and Search Report.

* cited by examiner

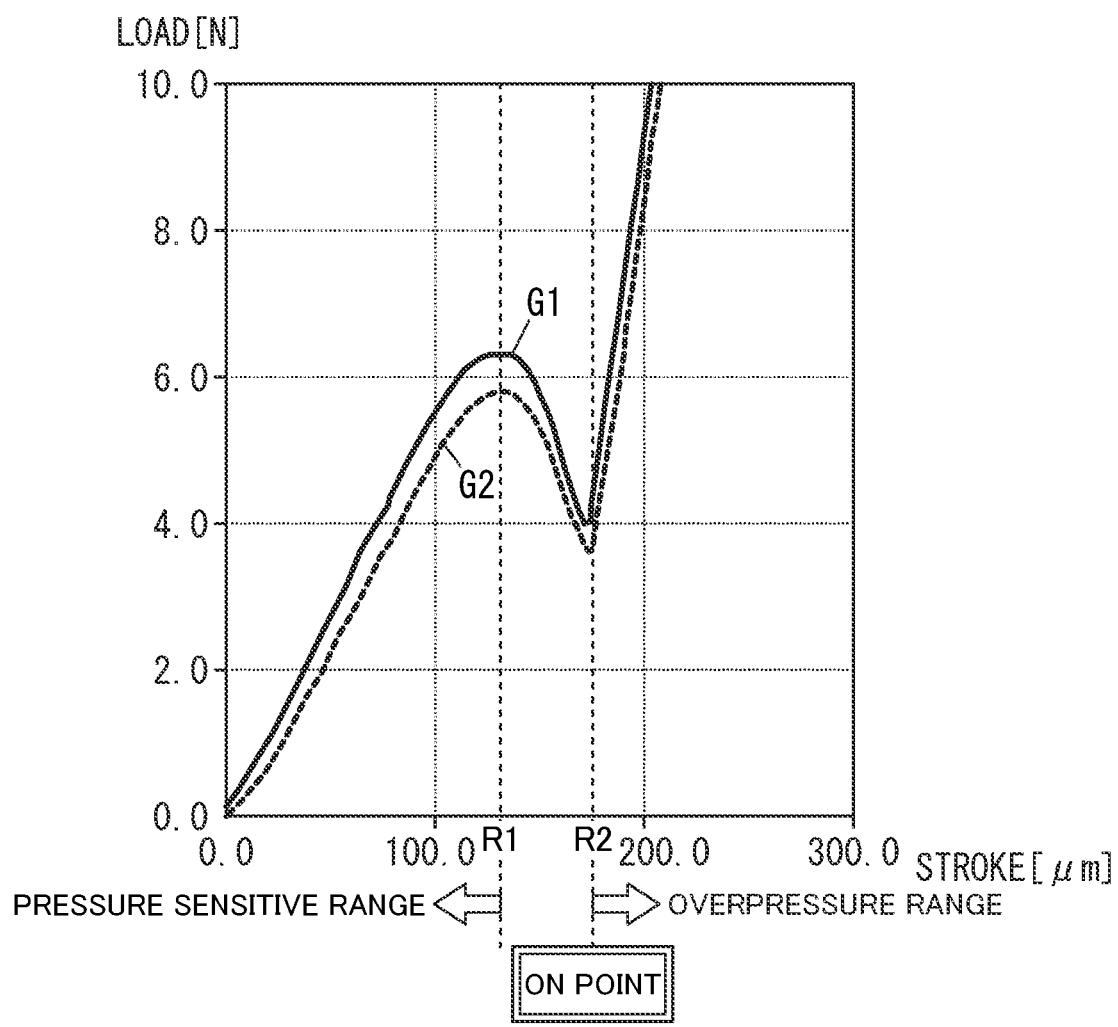

1

INPUT DEVICE

CROSS-REFERENCE OF RELATED APPLICATIONS

This application is the U.S. National Phase under 35 U.S.C. § 371 of International Patent Application No. PCT/JP2020/036612, filed on Sep. 28, 2020, which in turn claims the benefit of Japanese Patent Application No. 2019-187180, filed on Oct. 10, 2019, the entire disclosures of which Applications are incorporated by reference herein.

TECHNICAL FIELD

The present disclosure generally relates to input devices and specifically relates to an input device to be used for input to various electronic apparatuses.

BACKGROUND ART

Patent Literature 1 describes a push switch. The push switch includes a case, a movable member having a dome shape, and a contact portion. The movable member includes a pressure-receiving portion and is disposed in a recess formed in the case. In the push switch, the pressure-receiving portion is pressed toward a bottom surface of the recess, and the movable member thus deforms, so that the contact portion turns ON or OFF.

CITATION LIST

Patent Literature

Patent Literature 1: WO 2017/154694 A1

SUMMARY OF INVENTION

Downsizing (e.g., reducing the height of) the push switch (an input device) while maintaining the magnitude of pressing force required to deform the movable member may be desired.

In view of the foregoing, it is an object of the present disclosure to provide an input device which is downsized while the magnitude of required pressing force is maintained.

An input device of an aspect of the present disclosure includes a fixed electrode, a movable electrode, and a movable member. The movable member is configured to elastically deform by receiving pressing force to relatively displace the movable electrode toward the fixed electrode. The movable member has an outer peripheral part. The outer peripheral part includes a suppression structure configured to suppress the movable member from being elastically deformed by the pressing force.

BRIEF DESCRIPTION OF DRAWINGS

FIG. 5 is a graph of the relationship between the stroke and the load of the input device;

DESCRIPTION OF EMBODIMENTS

(1) Overview

The drawings to be referred to in the following description of embodiments are all schematic representations. That is to say, the ratio of the dimensions (including thicknesses) of respective constituent elements illustrated on the drawings does not always reflect their actual dimensional ratio.

Figure 1:
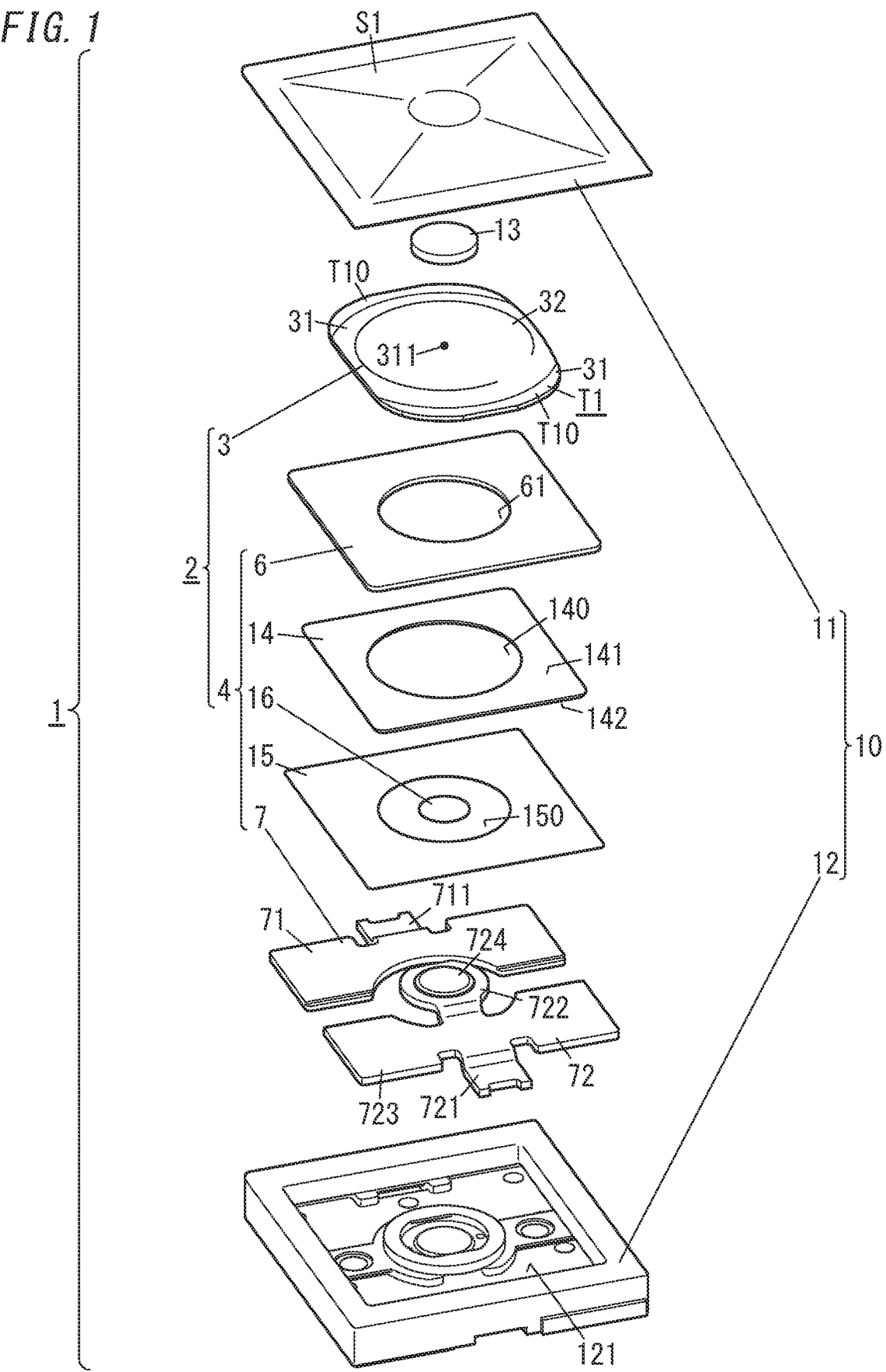
FIG. 1 is an exploded perspective view of an input device according to an embodiment.
Figure 2A:
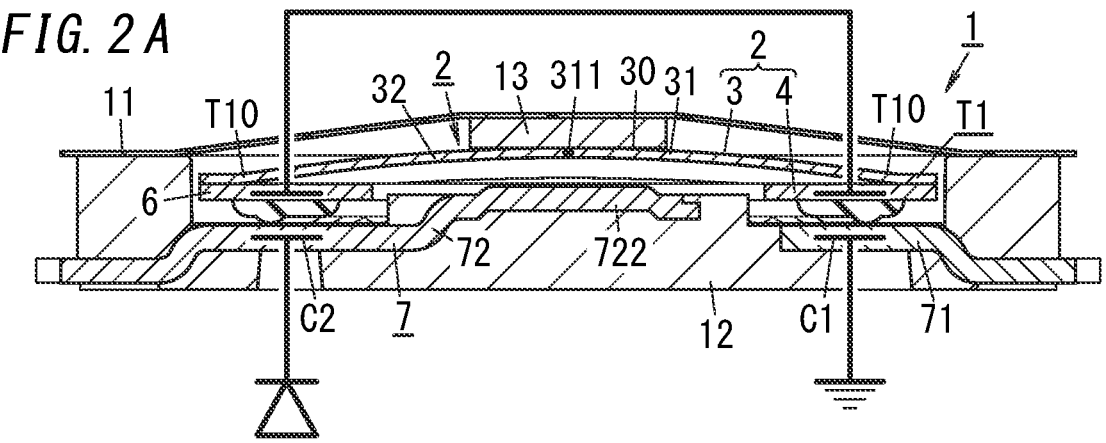
FIG. 2A is a schematic sectional view of the input device.
Figure 2B:
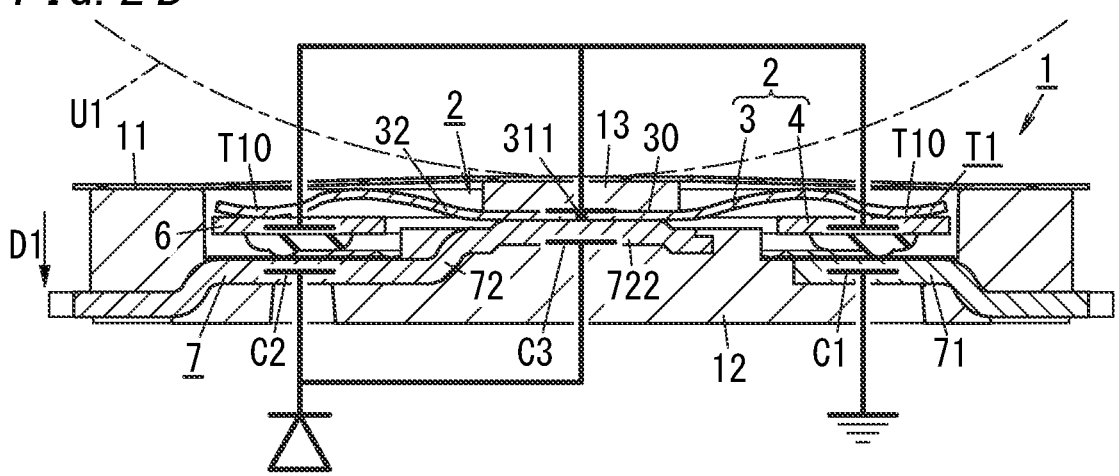
FIG. 2B is a schematic sectional view of a movable member of the input device, wherein a center part of the movable member is buckled.

As shown in FIGS. 1, 2A, and 2B, an input device 1 according to the present embodiment includes a fixed electrode 7, a movable electrode 6, and a movable member 3.

The movable member 3 is configured to elastically deform by receiving pressing force to relatively displace the movable electrode 6 toward the fixed electrode 7. In the present embodiment, the fixed electrode 7 and the movable electrode 6 constitute a pressure sensor 4, and the movable member 3 (a clicking part) and the pressure sensor 4 constitute a pressure sensitive unit 2. The movable member 3 has a center part 32 having a surface provided with a press surface 30 and is configured to provide a sense of click (e.g., a click sound) to an operation body U1 (see FIG. 2B) which applies the pressing force to the press surface 30. In the present embodiment, the operation body U1 is assumed to be, for example, a fingertip of a person (i.e., part of a living body) but is not particularly limited to this example. The operation body U1 may include part of a living body and an item (e.g., a glove) covering the part of the living body. The operation body U1 may further include an item (i.e., a stylus-type operation member) held by a living body. The pressure sensor 4 is disposed on an opposite side of the movable member 3 from the press surface 30. The pressure sensor 4 of the present embodiment is, for example, a capacitive sensor.

In the present embodiment, the movable member 3 has an outer peripheral part 31 including a suppression structure T1 configured to suppress the movable member 3 from being elastically deformed by the pressing force.

In this configuration, the movable member 3 includes the suppression structure T1, and therefore, for example, even when the dimension of the movable member 3 is made smaller than that of a movable member 3X (see FIGS. 4A and 4B) including no suppression structure T1, the movable member 3 can be deformed by pressing force substantially as great as pressing force required for the movable member 3X. In other words, downsizing (e.g., reduction in height) is possible while the magnitude of required pressing force is maintained.

(2) Details (2.1) Overall Configuration

With reference to FIGS. 1 to 7, the input device 1 of the present embodiment will be described in detail below.

As shown in FIGS. 1, 2A, and 2B, the input device 1 includes the pressure sensitive unit 2, a housing 10, and a pusher 13.

The input device 1 is applicable, for example, as a device to be used for input to various kinds of electronic apparatuses. Specifically, for example, the input device 1 is held in a housing of an electronic apparatus and outputs an input signal to a controller housed in the housing of the electronic apparatus. The controller of the electronic apparatus may output, to a circuit module housed in the housing of the electronic device, a control signal in accordance with the input signal received from the input device 1. The controller as used herein includes a computer system as a main component, and the computer system includes one or more processors and one or more memory components. In the controller, the one or more processors execute a program(s) stored in the memory component(s), thereby implementing functions of components of the controller. The program may be stored in the memory in advance, may be provided via a telecommunications network such as the Internet, or may be provided by a non-transitory storage medium such as a memory card storing the program.

(2.2) Housing

As shown in FIG. 1, the housing 10 houses the pressure sensitive unit 2 and the pusher 13. The housing 10 includes a cover 11 and a body 12. The body 12 has a flat quadrangular (e.g., square) box shape and has a first surface (an upper surface in FIG. 1) in the thickness direction thereof, and the first surface has an opening. The cover 11 is in the form of a quadrangular (e.g., square) film. The cover 11 is attached to the first surface of the body 12 to cover the opening in the first surface of the body 12.

The cover 11 and the body 12 are electrically insulating. For example, the cover 11 and the body 12 are made of an electrically insulating resin material. In particular, the cover 11 is flexible. Thus, the operation body U1 (e.g., a fingertip of a person) can apply pressing force via the cover 11 to the pressure sensitive unit 2 housed in the housing 10. Note that an operation plate, omitted in FIG. 2B, is provided to cover the cover 11, and the operating body U1 does not directly come into contact with the cover 11 but preferably applies the pressing force via the operation plate to the cover 11.

The cover 11 has a surface (in FIG. 1, an upper surface) which is located at an opposite side from the pressure sensitive unit 2 and which serves as a detection surface S1 of the input device 1. The detection surface S1 slightly protrudes in a direction away from the pressure sensitive unit 2. The detection surface S1 is a substantially square area when viewed from a front side of the cover 11. The detection surface S1 has a central part having a circular flat area, and the cover 11 has a back surface having an area which corresponds to the central part and in which the pusher 13 is stably positioned. As shown in FIG. 1, the body 12 has an accommodation recess 121 in which the pressure sensitive unit 2 is housed.

(2.3) Pressure Sensitive Unit

The pressure sensitive unit 2 includes the movable member 3 (clicking part) and the pressure sensor 4.

The pressure sensor 4 is a capacitive sensor. The pressure sensor 4 is configured to output an electric signal including a change in electrostatic capacity between the movable electrode 6 and the fixed electrode 7. The pressure sensor 4 is disposed on an opposite side (lower side) of the movable member 3 from the press surface 30 (see FIGS. 3A and 3B).

The pressure sensor 4 includes the movable electrode 6, an elastic body 14, insulating sheets (15, 16), and the fixed electrode 7. The movable electrode 6, the elastic body 14, the insulating sheets (15, 16), and the fixed electrode 7 are aligned in this order in a direction away from the movable member 3. That is, the movable electrode 6 of the components of the pressure sensor 4 is located closest to the movable member 3.

The movable electrode 6 is formed of an electrically conductive member (e.g., a metal plate material) and has a rectangular plate shape. The movable electrode 6 has a hole 61 penetrating its central part in the thickness direction thereof. The hole 61 has a substantially circular shape when viewed from a front side of the movable electrode 6.

The fixed electrode 7 is formed of an electrically conductive member (e.g., a metal plate material) and has a substantially rectangular flat plate shape as a whole. In an example, the fixed electrode 7 of the present embodiment is divided into two parts. That is, the fixed electrode 7 includes a first divided part 71 and a second divided part 72 (see FIG. 1) which face the movable electrode 6 (via the elastic body 14 and an insulating sheet 15). The first divided part 71 and the second divided part 72 are aligned with each other on substantially the same plane.

The first divided part 71 has a rectangular plate shape with a semicircular-arc-shaped cut-off at its edge portion facing the second divided part 72. The first divided part 71 has a terminal 711 at an opposite edge portion from the edge portion facing the second divided part 72. The terminal 711 protrudes in a direction generally away from the second divided part 72. The terminal 711 protrudes outside the housing 10 through a lead hole formed in a bottom of the accommodation recess 121 of the body 12.

The first divided part 71 is fixed to the body 12 by insert molding or the like, and generally only a surface of the first divided part 71 is exposed from a bottom surface of the accommodation recess 121.

The second divided part 72 has substantially the same plate shape as the first divided part 71 and has a terminal 721 protruding in a direction generally away from the first divided part 71. The terminal 721 protrudes outside the housing 10 through a lead hole formed in the bottom of the accommodation recess 121 of the body 12.

The second divided part 72 has an edge portion having a semicircular-arc-shaped cut-off, and the second divided part 72 is different from the first divided part 71 in that a tongue part 722 protruding in a direction toward the first divided part 71 is provided at the edge portion. In other words, the first divided part 71 and the second divided part 72, except for the tongue part 722, are plane-symmetrical to each other.

The tongue part 722 is substantially disk-shaped. The location of the tongue part 722 in the thickness direction of the movable electrode 6 is different from the location of a body section 723 of the second divided part 72. The body section 723 is rectangular. Specifically, the tongue part 722 is slightly bent in a direction toward the movable member 3 from an edge of the body section 723 and extends to be parallel to a surface of the body section 723. Moreover, the tongue part 722 has a central part provided with a contact 724 slightly protruding toward the movable member 3 by a drawing process or the like. The contact 724 has a circular shape viewed from a front side of the tongue part 722. The contact 724 is defined such that a surface of the contact 724 is generally located within the hole 61 formed in the movable electrode 6. The contact 724 is a part to which a summit part 311 of the movable member 3 comes into contact (via the insulating sheet 16).

The second divided part 72 is fixed to the body 12 by insert molding or the like. Only a surface of the tongue part 722 and the surface of the body section 723 are generally exposed from the bottom surface of the accommodation recess 121.

As described above, dividing the fixed electrode 7 into two parts, that is, the first divided part 71 and the second divided part 72 can further improve the sensitivity of the pressure sensitive unit 2. For example, even when the input device 1 receives an operation given by a fingertip (the operation body U1) wearing a glove or the like, the input device 1 is hardly influenced by the glove.

As shown in FIG. 1, the elastic body 14 is, for example, in the form of a rectangular sheet. The elastic body 14 is electrically conductive. The elastic body 14 is, for example, an electrically conductive rubber sheet. The elastic body 14 has a hole 140 penetrating its central part in the thickness direction thereof. The hole 140 has a substantially circular shape when viewed from a front side of the elastic body 14. The outer shape of the elastic body 14 is generally the same as the outer shape of the movable electrode 6. The thickness of the elastic body 14 is generally the same as the thickness of the movable electrode 6. The diameter dimension of the hole 140 is slightly larger than the diameter dimension of the hole 61 formed in the movable electrode 6. The elastic body 14 has a first surface 141 (in FIG. 1, an upper surface) disposed to be generally in surface contact with a back surface (in FIG. 1, a lower surface) of the movable electrode 6.

As shown in FIG. 1, the insulating sheet 15 is, for example, a rectangular sheet-like insulator (dielectric). The insulating sheet 15 has a hole 150 penetrating its central part in the thickness direction thereof. The hole 150 has a substantially circular shape when viewed from a front side of the insulating sheet 15. The outer shape of the insulating sheet 15 is generally the same as the outer shape of the movable electrode 6. In the present embodiment, the thickness of the insulating sheet 15 is smaller than the thickness of the movable electrode 6. The insulating sheet 15 is disposed to generally cover the surface of the first divided part 71 and a surface of the second divided part 72 which are exposed from the bottom surface of the accommodation recess 121. Note that the surface of the tongue part 722 is also covered with the insulating sheet 16. The insulating sheet 16 covering the surface of the tongue part 722 is a circular-shaped insulator (dielectric) separated from the insulating sheet 15 but may be integrated with the insulating sheet 15.

The movable member 3 has the press surface 30 (upper surface) and is configured to provide a sense of click to the operation body U1 which applies pressing force to the press surface 30. The movable member 3 is an elastically deformable part. The movable member 3 is configured to elastically deform by receiving the pressing force from the operation body U1 to relatively displace the movable electrode 6 toward the fixed electrode 7.

Specifically, the movable member 3 in the form of a flat dome-shaped thin plate protrudes in a direction away from the fixed electrode 7 and has the surface provided with the press surface 30. The movable member 3 is made of an elastic material (e.g., a metal plate). The movable member 3 is a so-called metal dome.

Figure 3A:
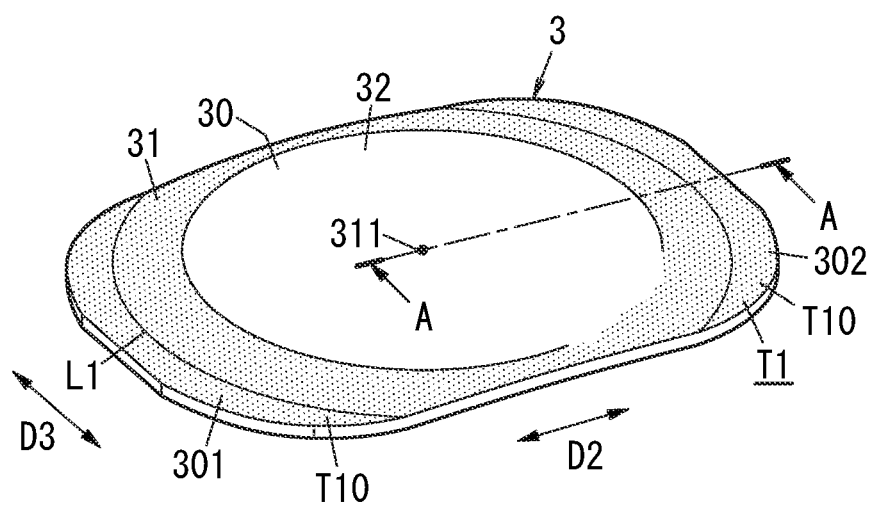
FIG. 3A is a perspective view of the movable member of the input device.
Figure 3B:
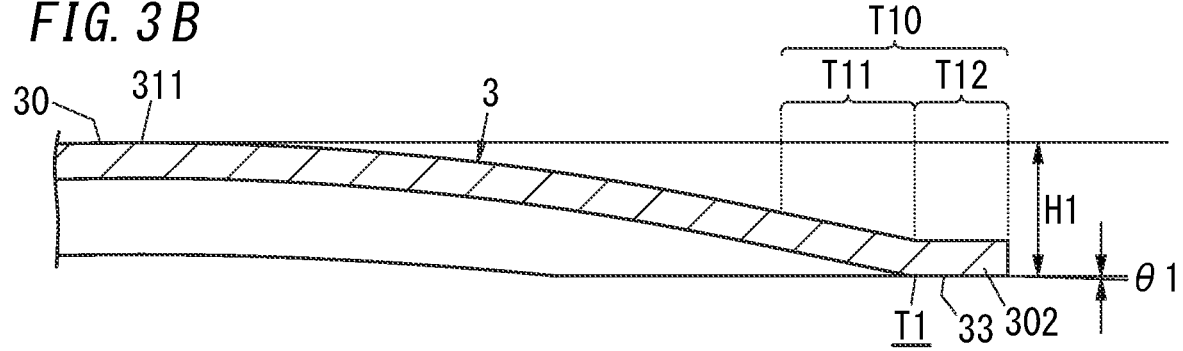
FIG. 3B is a sectional view of a main part of the movable member.

In particular, the movable member 3 of the present embodiment has, for example, a substantially oblong (substantially oval-shaped) metal dome as a whole when viewed along a pressing direction D1 (see FIG. 2B: in the example shown in the figure, downward). In other words, the movable member 3 has a shape elongated in one direction when viewed along the pressing direction D1 of the pressing force. As shown in FIG. 3A, the movable member 3 has a first end 301 and a second end 302 as both ends in the one direction (i.e., longitudinal direction D2). The first end 301 and the second end 302 each have a substantially arc-shaped outer edge. In contrast, both edges of the movable member 3 in a short direction D3 orthogonal to the pressing direction D1 and the longitudinal direction D2 each have a straight cut-off along the longitudinal direction D2. Note that FIG. 3B is a sectional view along line A-A of FIG. 3A and shows a cross section of a peripheral part including the second end 302 of the first end 301 and the second end 302.

The movable member 3 has the summit part 311 and is disposed on the movable electrode 6 such that the summit part 311 coincides with the center of the hole 61 of the movable electrode 6 when the movable member 3 is viewed from the front side.

The press surface 30 is a convex surface. When the press surface 30 receives pressing force, the movable member 3 elastically deforms as shown in FIG. 2B, thereby providing a sense of click. More specifically, the elastic deformation inverts the central part 32 of the movable member 3 from a rising state to a depressed state (buckling). Thus, when the press surface 30 receives the pressing force, the movable member 3 elastically deforms such that the press surface 30 is depressed, thereby providing the sense of click to the operation body U1.

The pusher 13 is a member that facilitates the occurrence of the elastic deformation of the movable member 3. As shown in FIG. 1, the pusher 13 has a disk shape. Moreover, the pusher 13 has an outer shape smaller than the outer shape of the movable member 3. The pusher 13 is disposed between the summit part 311 of the movable member 3 and the cover 11. The pusher 13 is fixed to the cover 11 or the movable member 3. The pusher 13 is desirably fixed to the cover 11. The pusher 13 is electrically insulating.

As shown in FIG. 3A, the outer peripheral part 31 of the movable member 3 of the present embodiment includes the suppression structure T1 configured to suppress the movable member 3 from being elastically deformed by the pressing force. In an example, the suppression structure T1 is provided to part of the movable member 3 in a circumferential direction of the movable member 3 when viewed along the pressing direction D1 of the pressing force. As used in the present disclosure, the "circumferential direction" is a direction around a central axis parallel to the pressing direction D1 and extending through the summit part 311.

That is, the suppression structure T1 is not provided to the entirety of the outer peripheral part 31 but is provided to both ends of the movable member 3, that is, the first end 301 and the second end 302. Moreover, the suppression structure T1 of the present embodiment is disposed such that its projection area to the fixed electrode 7 is within the region of the fixed electrode 7 when viewed along the pressing direction D1.

In FIG. 3A, in order to facilitate understanding of the explanation, the surface of the outer peripheral part 31 is expediently shaded with dots, but shading is not to precisely define the area of the outer peripheral part 31. A part on an inner side of the outer peripheral part 31 is the center part 32 having a substantially circular plate shape. The outer peripheral part 31 surrounds an outer edge of the center part 32. The center part 32 corresponds to a part that mainly buckles when the movable member 3 receives pressing force, but the outer peripheral part 31 may also partially buckle. The suppression structure T1 will be described in detail later.

(2.4) Basic Operation

Basic operation of the pressure sensitive unit 2 in response to pressing force received from the operating body U1 will be described below.

The pressure sensor 4 supports the movable member 3, and in response to the pressing force from the operating body U1, the movable member 3 pushes the movable electrode 6 toward the fixed electrode 7 by the outer peripheral part 31. In other words, the movable electrode 6 is a movable electrode which is movable, by receiving the pressing force via the movable member 3, in a direction toward the fixed electrode 7 while pushing the elastic body 14 and the insulating sheet 15. Moreover, when the center part 32 buckles in accordance with the pressing force from the operation body U1, the summit part 311 passes through the hole 61 formed in the movable electrode 6 and approaches the contact 724 of the tongue part 722 of the fixed electrode 7 and comes into contact with the insulating sheet 16 on the contact 724.

FIG. 2A schematically shows a circuit configuration before the central part 32 of the movable member 3 buckles. The movable electrode 6 and the first divided part 71 of the fixed electrode 7 may form a capacitor C1. The movable electrode 6 and the second divided part 72 of the fixed electrode 7 may form a capacitor C2. The capacitors C1 and C2 are connected in series via the movable member 3 which is electrically conductive.

The operation body U1 touches the detection surface S1 (or the operation plate) of the cover 11 and pushes the movable member 3, thereby compressing the elastic body 14, which changes the distance and the counter area between the movable electrode 6 and the fixed electrode 7. Thus, electrostatic capacity of a composite of the capacitors C1 and C2 changes. An analogue electric signal including the change in the electrostatic capacity can then be output via the terminals 711 and 721 to an outside of the input device 1. Note that the symbol of a diode connected to one electrode of the capacitor C2 in FIG. 2A visually shows that the electrostatic charges accumulated in the capacitors C1 and C2 flow only to a ground point side, but this symbol is not intended to indicate the actual existence of the diode.

In contrast, FIG. 2B schematically shows a circuit configuration after the central part 32 of the movable member 3 buckles. The central part 32 comes into contact with the tongue part 722 of the second divided part 72 of the fixed electrode 7 via the insulating sheet 16 (hereinafter referred to as "turning ON" of the contact point in some cases), thereby forming a capacitor C3. The capacitor C1 and the capacitor C3 are connected in parallel. Thus, after the turning ON of the contact point, an analogue electric signal including a change in electrostatic capacity of a composite of the capacitors C1 to C3 due to a further additional load can be output via the terminals 711 and 721. Note that the symbol of a diode connected to one electrode of the capacitor C2 in FIG. 2B visually shows that the electrostatic charges accumulated in the capacitors C1 and C3 flow only to the ground point side, but this symbol is not intended to indicate the actual existence of the diode.

Thus, when the operating body U1 pushes the press surface 30 of the movable member 3, pressure is applied to the pressure sensor 4. Thus, as the amount of depression (stroke) of the movable member 3 increases, the electrostatic capacity of the pressure sensor 4 (the capacitors C1 and C2) increases. When the amount of depression (stroke) of the movable member 3 increases and reaches a prescribed value, the central part 32 of the movable member 3 elastically deforms, thereby providing a sense of click. When the center part 32 elastically deforms, the center part 32 comes into contact with the insulating sheet 16 on the contact 724 of the fixed electrode 7, thereby forming the capacitor C3, which significantly changes the distance between the summit part 311 of the movable member 3 and the fixed electrode 7. Such a large change in distance appears as a large change in the electrostatic capacity of the pressure sensor 4. Further application of an additional load even after the contact point is turned ON results in a significant change in overall composite electrostatic capacity, inclusively of the capacitor C3. When the pressing force is no longer applied from the operating body U1, the movable member 3 elastically returns to the state shown in FIG. 2A, and thus, the contact point is turned OFF.

The controller of the electronic apparatus is electrically connectable to the input device 1. The electrostatic capacity of the pressure sensor 4 of the pressure sensitive unit 2 can be acquired by various methods, and, for example, a switched capacitor system may be adopted. In the switched capacitor system, (a change in) the electrostatic capacity of the pressure sensor 4 are detected based on the amount of electric charges accumulated in the capacitors C1 to C3. The controller of the electronic apparatus alternately performs a charge process and a discharge process repeatedly on the capacitors in a sequential order based on, for example, the switched capacitor system, for a predetermined time. The charge process is a process of charging the capacitor. The discharge process is a process of discharging the capacitor to charge a capacitor for determination with the accumulated electric charges. When a voltage across the capacitor for determination reaches a specified value, the discharge process is ended, and the charge process is started. That is, as the electrostatic capacity increases, the number of times that the voltage across the capacitor for the determination reaches the specified value within a predetermined time increases. Thus, the controller of the electronic apparatus can determine a change in the electrostatic capacity based on the number of times that the voltage across the capacitor for the determination reaches the specified value within the predetermined time. As a result, the controller of the electronic apparatus can determine, from a sensing result regarding the change in the electrostatic capacity, various operational states (operation inputs) of the operating body U1. The sensing results may include, for example, touching, pushing, and clicking the pressure sensitive unit 2. The pushing of the pressure sensitive unit 2 means application of a load which is heavier (which causes a greater change in the electrostatic capacity) than that in the case of the touching but which is lighter than that in the case of the clicking so that the contact point is not turned ON.

The controller of the electronic apparatus monitors a change in the electrostatic capacity of the pressure sensitive unit 2 to determine an operational state to which the input given to the input device 1 corresponds, and the controller outputs a control signal corresponding to the operational state to an external component (e.g., another circuit module).

(2.5) Suppression Structure

The suppression structure T1 of the movable member 3 will be described below in more detail.

As shown in FIG. 3A, the suppression structure T1 of the present embodiment has a bent part T10 (in the present embodiment, a pair of bent parts T10) bent along a fold line L1. The pair of bent parts T10 are provided to the first end 301 and the second end 302 on a one-to-one basis. The pair of bent parts T10 are plane-symmetrical to each other. The pair of bent parts T10 are bent along a pair of fold lines L1 each of which is a circularly arc-shaped line when viewed along the pressing direction D1.

As shown in FIG. 3B, each bent part T10 includes a base part T11 and a folded part T12.

The base part T11 is provided on an inner side of the fold line L1 when viewed along the pressing direction D1 of the pressing force. The base part T11 generally corresponds to a part of the outer peripheral part 31 shaded with dots in FIG. 3A, the part being on an inner side of the fold line L1. The base part T11 is substantially annular when viewed along the pressing direction D1. The base part T11 has a surface which is a gently curved surface continuous with a surface (curved surface) of the center part 32.

The folded part T12 is provided on an outer side of the fold line L1 and is folded relative to the base part T11 when viewed along the pressing direction D1 of the pressing force. The folded part T12 is along a surface of the fixed electrode 7. As used herein, the "folded part T12 is along a surface of the fixed electrode 7" means not only that the folded part T12 is "parallel to the surface of the fixed electrode 7" but also means, for example, that the folded part T12 is "tilted with respect to the surface of the fixed electrode 7 within a range from about −10° to about +10°".

The folded part T12 has a substantially crescent shape when viewed along the pressing direction D1. The folded part T12 has both flat surfaces in the thickness direction thereof and is plate-shaped. The folded part T12 has, as one surface of both the surfaces in its thickness direction, a counter surface 33 (in FIG. 3B, a lower surface) facing the movable electrode 6. For example, in a state where no pressing force is applied from the operating body U1 (see FIG. 2A), a (designed) outer perimeter angle θ1 of the counter surface 33 with respect to the surface of the fixed electrode 7 is 0°. In other words, the folded part T12 in the present embodiment is (substantially) parallel to the surface of the fixed electrode 7. The folded part T12 is also substantially parallel to the surface of the movable electrode 6. However, when the movable member 3 receives the pressing force from the operating body U1 and thus elastically deforms, a tip end of the folded part T12 deforms to bounce in a direction away from the movable electrode 6 as shown in FIG. 2B and may thus form an outer perimeter angle θ1 of greater than or equal to about 5°. That is, in a state where the movable member 3 receives no pressing force from the operating body U1, the folded part T12 is substantially in surface contact with the surface of the movable electrode 6, and as the pressing force increases, the folded part T12 deforms in a direction in which the contact area decreases due to bounce.

Figure 4A:
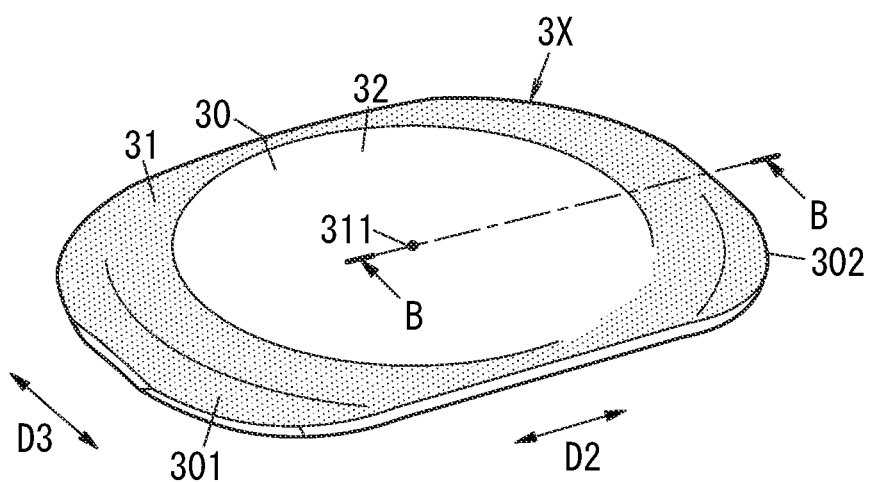
FIG. 4A is a perspective view of a movable member of a comparative example to be compared with the input device.
Figure 4B:
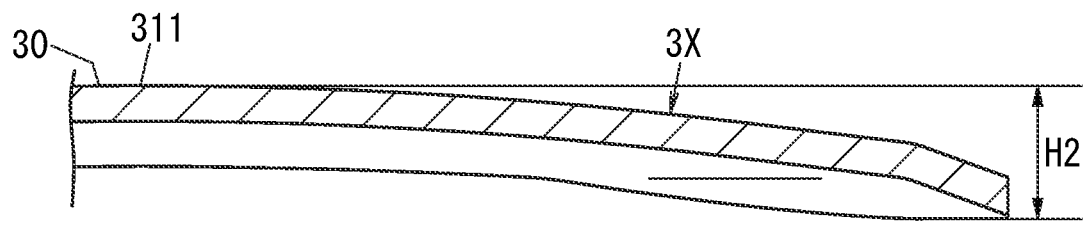
FIG. 4B is a sectional view of a main part of the movable member of the comparative example.

Referring now to FIGS. 4A and 4B, a movable member 3X will be described as a comparative example to be compared with the movable member 3 of the present embodiment. The movable member 3X is formed as a metal dome having a substantially oblong shape (substantially oval shape) as a whole similarly to the movable member 3 and has a press surface 30, a center part 32 having a substantially circular plate-like shape, and an outer peripheral part 31 surrounding an outer edge of the center part 32. In FIG. 4A, in order to facilitate understanding of the explanation, the surface of the outer peripheral part 31 is expediently shaded with dots, but shading is not to precisely define the area of the outer peripheral part 31.

The movable member 3X includes no suppression structure T1. That is, the surface of the outer peripheral part 31 of the movable member 3X is a gently curved surface continuous with a surface (a curved surface) of the center part 32. FIG. 4B is a sectional view along line B-B of FIG. 4A.

Referring now to FIG. 5, performance characteristics of the input device 1 including the movable member 3 and an input device 1 including the movable member 3X in place of the movable member 3 will be described.

FIG. 5 is a graph of the relationship (characteristics) between the stroke and the pressing force relating to the movable member 3 and the movable member 3X. In FIG. 5, the solid line represents the characteristic G1 relating to the movable member 3, and the broken line represents the characteristic G2 relating to the movable member 3X. The abscissa represents the stroke (amount) [μm] (in other words, pressing amount) of each movable member. The ordinate represents the load [N] (pressing force) applied to each movable member.

In the example shown in FIG. 5, at a time point at which the stroke reaches R1 from 0, each central part 32 is inverted from a rising state to a depressed state. In a range (pressure sensitive range) from 0 to R1 of the stroke, the characteristics G1 and G2 gradually increase to draw gentle curves. Each central part 32 goes into the depressed state, a corresponding one of the movable members is further pushed, and at a time point at which the stroke reaches R2, each central part 32 comes into contact with the contact 724 of the fixed electrode 7 via the insulating sheet 16 (turning ON of a contact point). In a range from R1 to R2 of the stroke, the characteristics G1 and G2 gradually decrease and start increasing again immediately before R2. In a range (an overpressure range) of the stroke of greater than or equal to R2, the characteristics G1 and G2 rapidly increase. Note that "the pressing force required for the movable member" as used in the present disclosure is assumed to be, for example, a load required for the stroke to reach R1.

In this case, it can be easily understood from FIG. 5 that the movable member 3 corresponding to the characteristic G1 requires a heavier load (pressing force) for the same stroke than the movable member 3X corresponding to the characteristic G2. That is, when each movable member receives pressing force and the summit part 311 is pushed in, the entirety of the center part 32 deforms to outwardly extend with the summit part 311 serving as the center when viewed along the pressing direction D1. However, in the movable member 3, the suppression structure T1 having the bent part T10 suppresses the center part 32 from extending. In sum, the movable member 3 has enhanced stiffness compared to the movable member 3X.

Incidentally, as the height H1 (see FIG. 3B: dimension from the counter surface 33 to an apex of the press surface 30) of the movable member 3 is reduced, the pressing force required for the movable member 3 also decreases. The movable member 3 includes the suppression structure T1, and therefore, dimensionally designing the movable member 3 with a smaller height H1 than the height H2 (see FIG. 4B) of the movable member 3X (reducing the height) enables the movable member 3 to be deformed with pressing force substantially equal to the pressing force required for the movable member 3X. In other words, downsizing is possible while the magnitude of the required pressing force is maintained.

Moreover, the suppression structure T1 has the bent part T10, and therefore, the suppression structure T1 is easily fabricated with a simple configuration. In particular, when the movable member 3 is produced by a forming process, the suppression structure T1 having the bent part T10 is easily formable, and therefore, cost is reduced more than when another component corresponding to the suppression structure T1 is fixed by an adhesion, welding, or the like.

Moreover, the suppression structure T1 is provided to part of the movable member 3 in a circumferential direction of the movable member 3, and therefore, cost relating to formation of the suppression structure T1 can be reduced more than in the case where, for example, the suppression structure T1 is provided to the entirety of the movable member 3 in the circumferential direction of the movable member 3. Moreover, since the folded part T12 is along the surface of the fixed electrode 7, the height H1 of the movable member 3 can be suppressed, and more effective downsizing (reduction in the height) of the input device 1 can be performed.

(2.6) Outer Perimeter Angle

Now, differences in outer perimeter angle (angle of the folded part T12) of the movable member 3 with respect to the surface of the fixed electrode 7 (or the movable electrode 6) will be described. It has been described above that the outer perimeter angle $\theta 1$ of the counter surface 33 with respect to the surface of the fixed electrode 7 is 0°. However, the outer perimeter angle $\theta 1$ is not limited to 0°.

FIGS. 6A to 6E show five types of movable members 3 having different outer perimeter angles $\theta 1$. FIG. 6F shows a movable member 3X as a comparative example including no suppression structure T1.

Figure 6A:
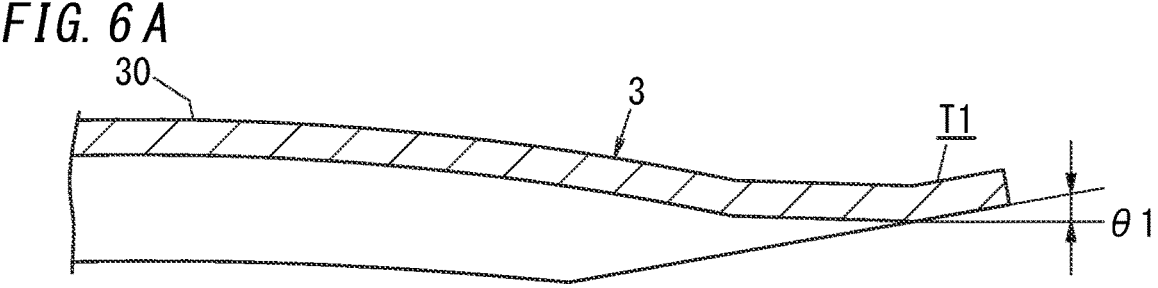
FIGS. 6A to 6F are views illustrating outer perimeter angles of the movable members.
Figure 6B:
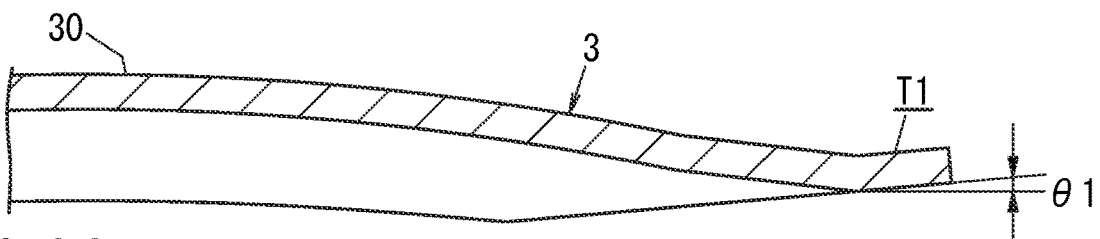
Figure 6C:
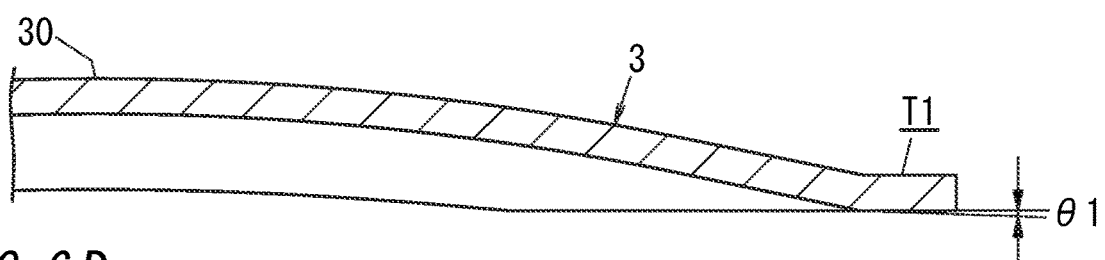
Figure 6D:
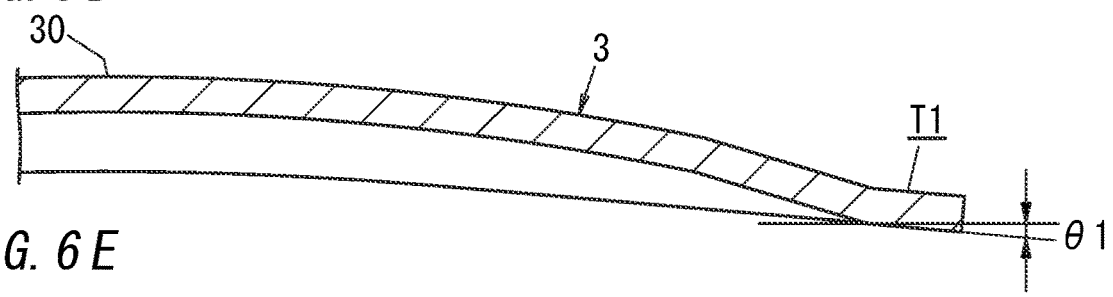
Figure 6E:
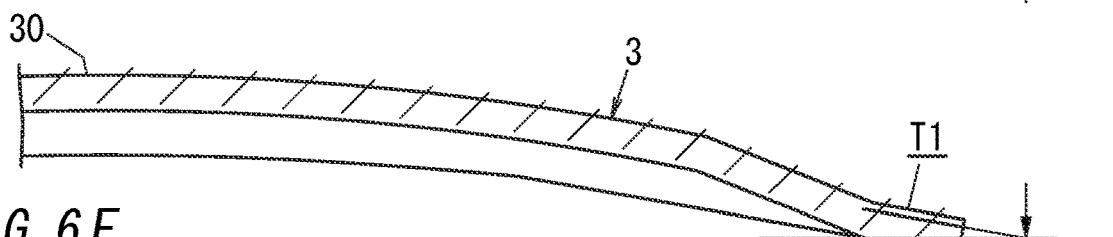
Figure 6F:
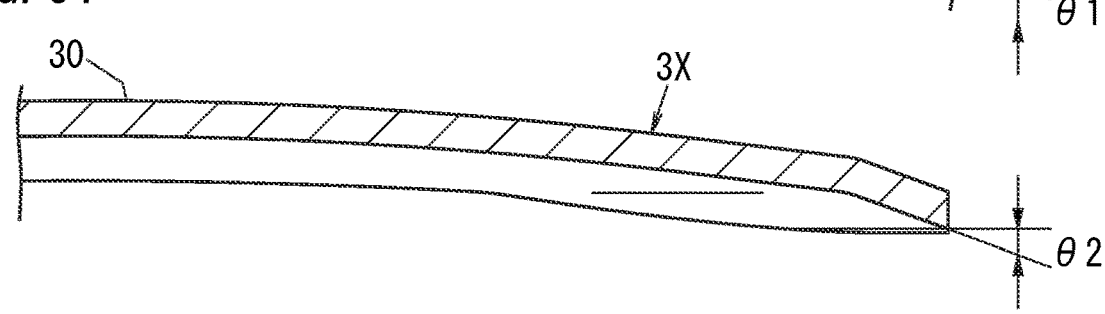

In FIG. 6A, the outer perimeter angle $\theta 1$ of the movable member 3 is −10°. In FIG. 6B, the outer perimeter angle $\theta 1$ of the movable member 3 is −5°. In FIG. 6C, the outer perimeter angle $\theta 1$ of the movable member 3 is 0° and is the angle explained in "(2.5) Suppression Structure". In FIG. 6D, the outer perimeter angle $\theta 1$ of the movable member 3 is +5°. In FIG. 6E, the outer perimeter angle $\theta 1$ of the movable member 3 is +10°. In FIG. 6F, the outer perimeter angle $\theta 2$ of the movable member 3X is an angle of a back surface of the outer peripheral part 31 with respect to a surface of the fixed electrode 7 and is +20°.

Figure 7:
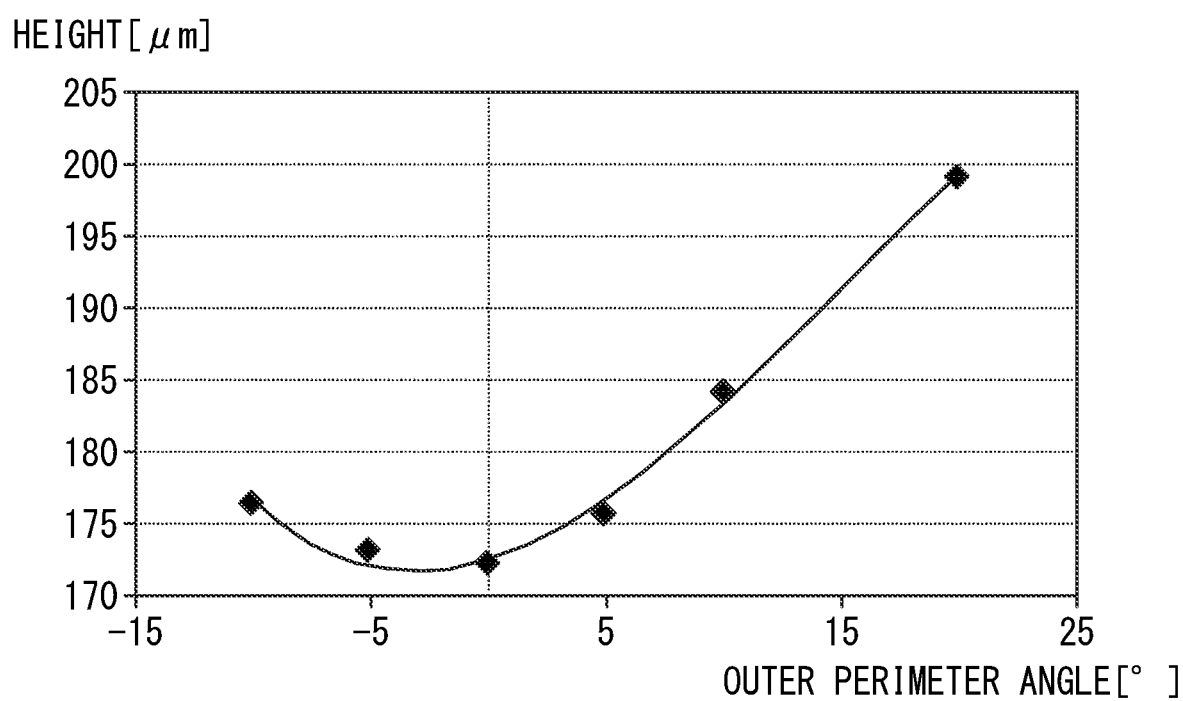
FIG. 7 is a graph of the relationship between the outer perimeter angle and the height of the movable members.

FIG. 7 is a graph of the relationship (characteristic) of the outer perimeter angle and the height of the five types of movable members 3 and the movable members 3X as the comparative example, shown in FIGS. 6A to 6F. FIG. 7 shows a result of adjusting, with reference the movable member 3X as the comparative example, the height H1 of the five types of movable members 3 such that the movable members 3 are deformed with pressing force substantially equal to the pressing force required for the movable member 3X. It can be easily understood from FIG. 7 that the height H1 of a movable member 3 having an outer perimeter angle $\theta 1$ of 0° is most suppressed. Note that the height H1 of a movable member 3 having an outer perimeter angle $\theta 1$ of, for example, −10°, −5°, +5°, or +10° is also satisfactorily suppressed, compared to the movable member 3X having an outer perimeter angle of 20°. Note that the outer perimeter angle $\theta 1$ is preferably within a range from −10° to +10°, more preferably within a range from −5° to +5°.

(2.7) Clicking Feeling

Incidentally, it may be desirable for a plurality of input devices 1 to have different required pressing force (provide different clicking feelings) with their exteriors having the same dimension.

Providing the restriction structure T1 enables the height of the movable member 3 to be reduced to reduce the height of the input device 1 while maintaining the pressing force substantially equal to the pressing force in the case where the restriction structure T1 is not provided, which conversely means that when the heights of the movable members 3 are made equal to each other, required processing force can be made different between the plurality of input devices 1 by providing or not providing the restriction structure T1. Moreover, more differences can be made in the pressing force also between the plurality of input devices 1 including the suppression structures T1 by making the heights of the movable members 3 equal to each other while the outer perimeter angles are made different.

For example, the plurality of input devices 1 may constitute an input system. The plurality of input devices 1 may have a plurality of movable members 3 having different loads required for the stroke to reach R1 (FIG. 5) (the plurality of input devices 1 may include the movable members 3X).

(3) Variations

The embodiment described above is merely an example of various embodiments of the present disclosure. Rather, the embodiment may be readily modified in various manners depending on a design choice or any other factor without departing from the scope of the present disclosure. Next, variations of the embodiment described above will be enumerated one after another. The variations described below are applicable accordingly in combination. In the following description, the embodiment described above will be sometimes referred to as a "basic example".

(3.1) First Variation

Figure 8A:
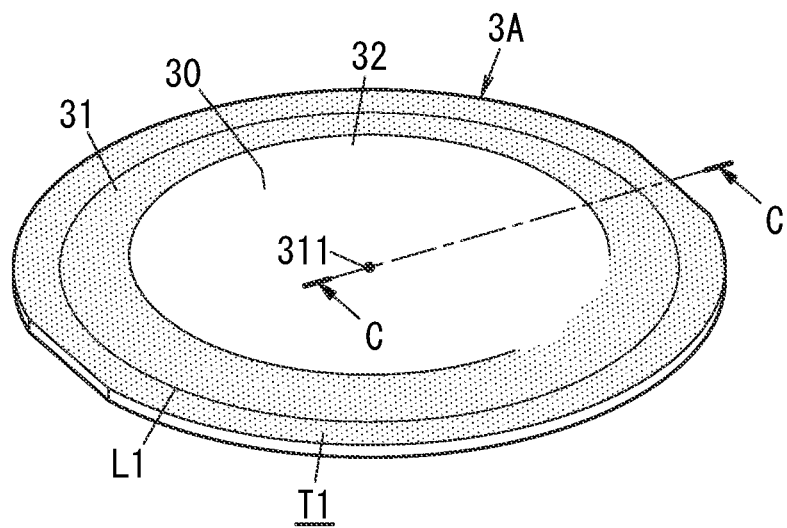
FIG. 8A is a perspective view of a movable member of a first variation of the input device.
Figure 8B:
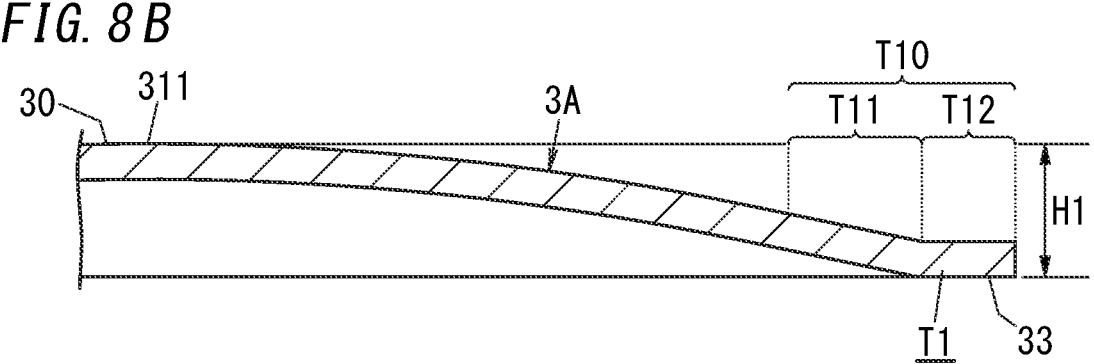
FIG. 8B is a sectional view of a main part of the movable member of the first variation.

An input device 1 of the present variation (a first variation) will be described below with reference to FIGS. 8A and 8B. The input device 1 of the present variation is different from the input device 1 of the basic example in that a movable member 3A is provided which has a structure different from the structure of the movable member 3 of the basic example. Thus, in FIGS. 8A and 8B, only the movable member 3A is shown, and the description of components other than the movable member 3A will be omitted. In the movable member 3A, components substantially common to the components of the movable member 3 of the basic example are denoted by the same reference signs as those in the basic example, and the description thereof may accordingly be omitted. Note that FIG. 8B is a sectional view along line C-C of FIG. 8A.

The movable member 3A is formed as a metal dome having a substantially round shape as a whole and has a press surface 30, a center part 32 having a substantially circular plate-like shape, and an outer peripheral part 31 surrounding an outer edge of the center part 32. In FIG. 8A, in order to facilitate understanding of the explanation, the surface of the outer peripheral part 31 is expediently shaded with dots, but shading is not to precisely define the area of the outer peripheral part 31. The outer peripheral part 31 of the movable member 3A includes a suppression structure T1 configured to suppress elastic deformation from being caused by pressing force. Note that the suppression structure T1 of the present variation is provided to the entirety of the movable member 3A in the circumferential direction when viewed along the pressing direction D1.

The suppression structure T1 of the present variation has one bent part T10 bent along a fold line L1 having the substantially circular shape when viewed along the pressing direction D1. The bent part T10 of present variation has a base part T11 being substantially annular and a folded part T12 being substantially annular and disposed on an outer side of the base part T11 when viewed along the pressing direction D1. The base part T11 has a surface which is a gently curved surface continuous with a surface (curved surface) of the center part 32. The folded part T12 has both flat surfaces in the thickness direction thereof and is plate-shaped. The folded part T12 is (substantially) parallel to the surface of the fixed electrode 7.

Figure 9A:
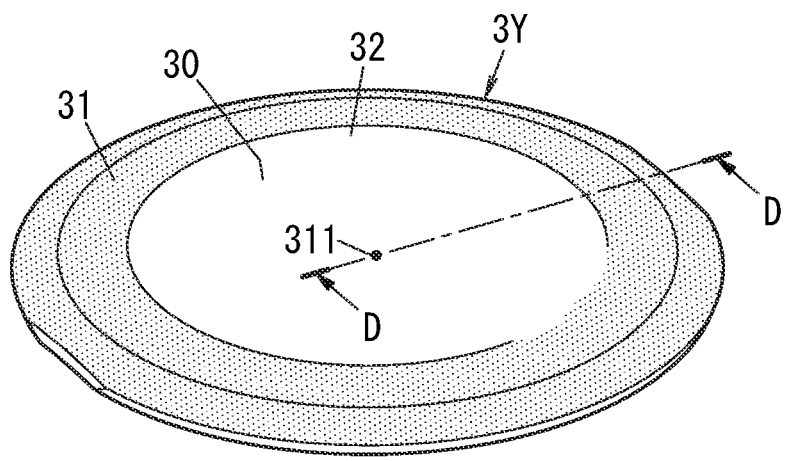
FIG. 9A is a perspective view of a movable member of a comparative example to be compared with the first variation.
Figure 9B:
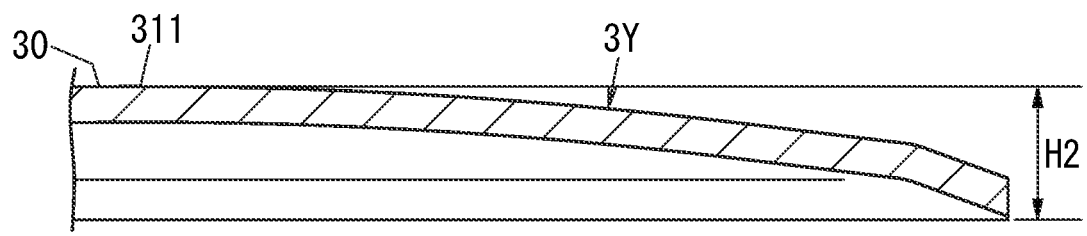
FIG. 9B is a sectional view of a main part of the movable member of the comparative example.

Referring now to FIGS. 9A and 9B, a movable member 3Y will be described as a comparative example to be compared with the movable member 3A of the present variation. The movable member 3Y is formed as a metal dome having a substantially round shape as a whole similarly to the movable member 3A and has a press surface 30, a center part 32, and an outer peripheral part 31. In FIG. 9A, in order to facilitate understanding of the explanation, the surface of the outer peripheral part 31 is expediently shaded with dots, but shading is not to precisely define the area of the outer peripheral part 31.

The movable member 3Y includes no suppression structure T1. That is, the surface of the outer peripheral part 31 of the movable member 3Y is a gently curved surface continuous with a surface (a curved surface) of the center part 32. Note that FIG. 9B is a sectional view along line D-D of FIG. 9A.

The movable member 3A of the present variation also includes the suppression structure T1, and therefore, dimensionally designing the movable member 3A with a smaller height H1 than the height H2 (see FIG. 9B) of the movable member 3Y (reducing the height) enables the movable member 3A to be deformed with pressing force substantially equal to the pressing force required for the movable member 3Y. In other words, downsizing is possible while the magnitude of the required pressing force is maintained.

Note that also in the present variation, as described in the basic example, the height H1 of the movable member 3A is most suppressed when the outer perimeter angle (angle of the folded part T12) of the movable member 3B with respect to the surface of the fixed electrode 7 is set to 0°. However, even when the outer perimeter angle of the movable member 3A may be −10°, −5°, +5°, +10°, or the like, for example, the height H1 is satisfactorily suppressed compared to the movable member 3Y in which the angle of the back surface of the outer peripheral part 31 with respect to the surface of the fixed electrode 7 is 20°.

(3.2) Second Variation

Figure 10A:
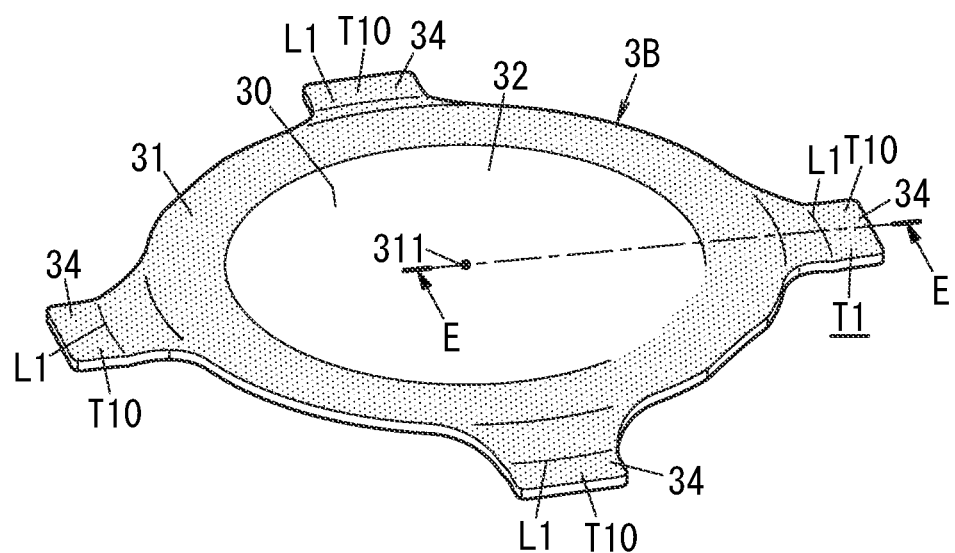
FIG. 10A is a perspective view of a movable member of a second variation of the input device.
Figure 10B:
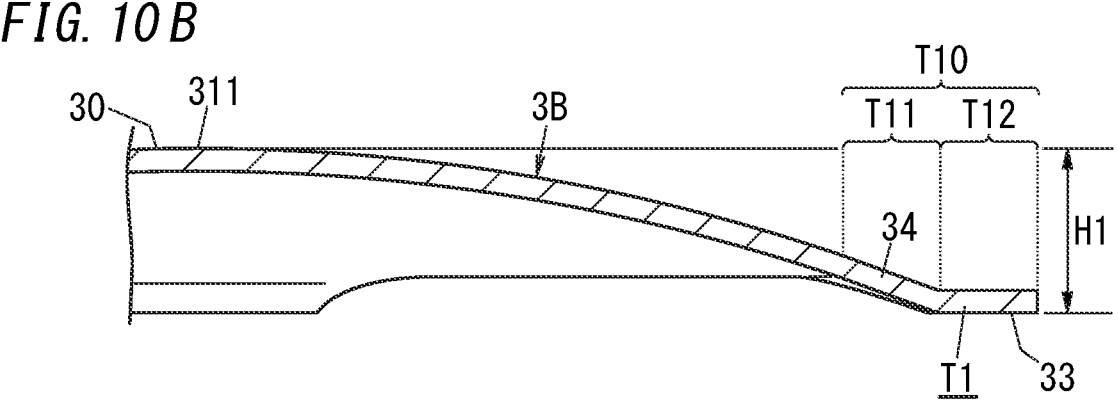
FIG. 10B is a sectional view of a main part of the movable member of the second variation.

An input device 1 of the present variation (a second variation) will be described below with reference to FIGS. 10A and 10B. The input device 1 of the present variation is different from the input device 1 of the basic example in that a movable member 3B is provided which has a structure different from the structure of the movable member 3 of the basic example. Thus, in FIGS. 10A and 10B, only the movable member 3B is shown, and the description of components other than the movable member 3B will be omitted. In the movable member 3B, components substantially common to the components of the movable member 3 of the basic example are denoted by the same reference signs as those in the basic example, and the description thereof may be omitted. FIG. 10B is a sectional view along line E-E of FIG. 10A.

The movable member 3B is formed as a metal dome having a substantially round shape with four legs (substantially throwing star shape) as a whole and has a press surface 30, a center part 32 having a substantially circular plate-like shape, and an outer peripheral part 31 surrounding an outer edge of the center part 32. In FIG. 10A, in order to facilitate understanding of the explanation, the surface of the outer peripheral part 31 is expediently shaded with dots, but shading is not to precisely define the area of the outer peripheral part 31. The outer peripheral part 31 of the movable member 3B has a suppression structure T1 configured to suppress elastic deformation from being caused by pressing force.

The suppression structure T1 of the present variation is provided to part of the movable member 3B in a circumferential direction of the movable member 3B when viewed along the pressing direction D1. Specifically, the outer peripheral part 31 has four leg sections 34 protruding outward. The four leg sections 34 are arranged at substantially equal intervals along the circumferential direction of the movable member 3B when viewed along the pressing direction D1. Each leg section 34 has a rectangular plate shape.

The suppression structure T1 of the present variation includes four bent parts T10 each bent along a corresponding one of fold lines L1. Each fold line L1 is a circularly arc-shaped line when viewed along the pressing direction D1. The four bent parts T10 are provided to the respective four leg sections 34.

Each bent part T10 of the present variation includes a base part T11 and a folded part T12. The base part T11 has a surface which is a gently curved surface continuous with a surface (curved surface) of the center part 32. The folded part T12 has both flat surfaces in the thickness direction thereof and is plate-shaped. The folded part T12 is (substantially) parallel to the surface of the fixed electrode 7.

Figure 11A:
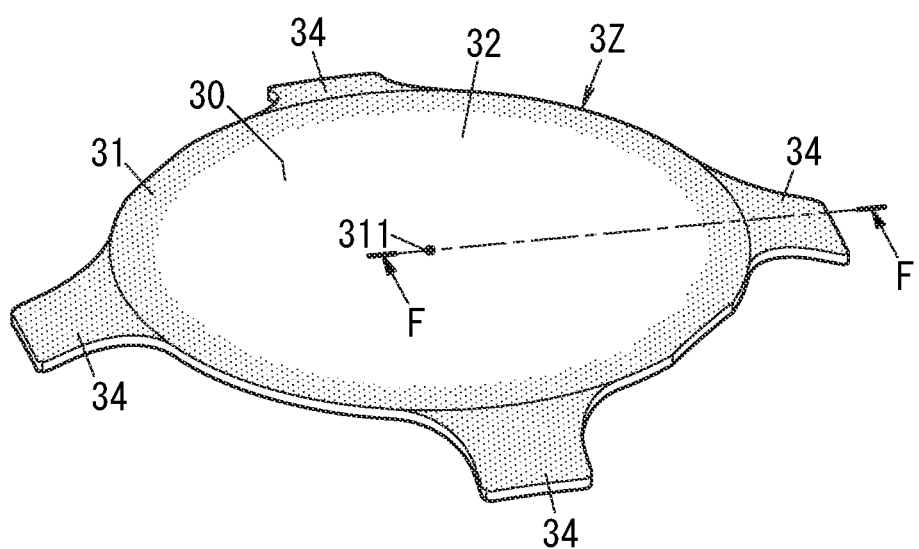
FIG. 11A is a perspective view of a movable member of a comparative example to be compared with the second variation.
Figure 11B:
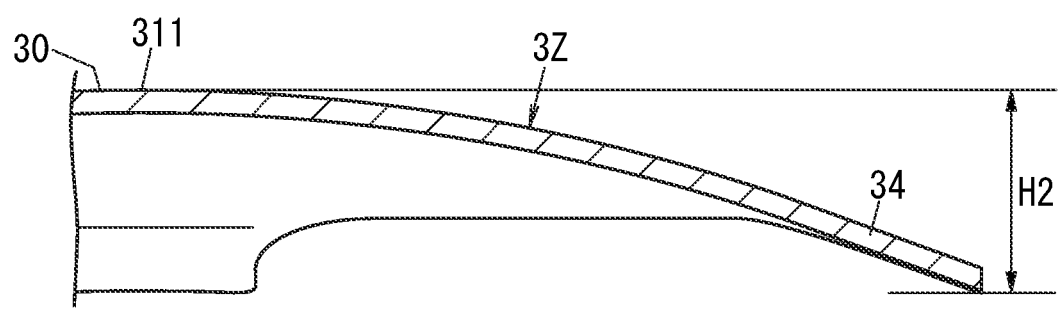
FIG. 11B is a sectional view of a main part of the movable member of the comparative example.

Referring now to FIGS. 11A and 11B, a movable member 3Z will be described as a comparative example to be compared with the movable member 3B of the present variation. Similarly to the movable member 3B, the movable member 3Z is formed as a metal dome having a substantially round shape with four legs (substantially throwing star shape) as a whole and has a press surface 30, a center part 32, and an outer peripheral part 31. In FIG. 11A, in order to facilitate understanding of the explanation, the surface of the outer peripheral part 31 is expediently shaded with dots, but shading is not to precisely define the area of the outer peripheral part 31.

The movable member 3Z includes no suppression structure T1. That is, the surface of the outer peripheral part 31 of the movable member 3Z is a gently curved surface continuous with a surface (a curved surface) of the center part 32. In particular, surfaces of the four leg sections 34 provided to the outer peripheral part 31 and protruding outward are also gently curved surfaces continuous with the surface (curved surface) of the center part 32. FIG. 11B is a sectional view along line F-F of FIG. 11A.

The movable member 3B of the present variation also includes the suppression structure T1, and therefore, dimensionally designing the movable member 3B with a smaller height H1 than the height H2 (see FIG. 11B) of the movable member 3Z (reducing the height) enables the movable member 3B to be deformed with pressing force substantially equal to the pressing force required for the movable member 3Z. In other words, downsizing is possible while the magnitude of the required pressing force is maintained.

Note that also in the present variation, the height H1 of the movable member 3B is most suppressed when the outer perimeter angle (angle of the folded part T12) of the movable member 3B with respect to the surface of the fixed electrode 7 is set to 0°. However, even when the outer perimeter angle of the movable member 3B may be −10°, −5°, +5°, +10°, or the like, for example, the height H1 is satisfactorily suppressed compared to the movable member 3Z in which the angle of the back surface of the outer peripheral part 31 with respect to the surface of the fixed electrode 7 is 20°.

Figure 12A:
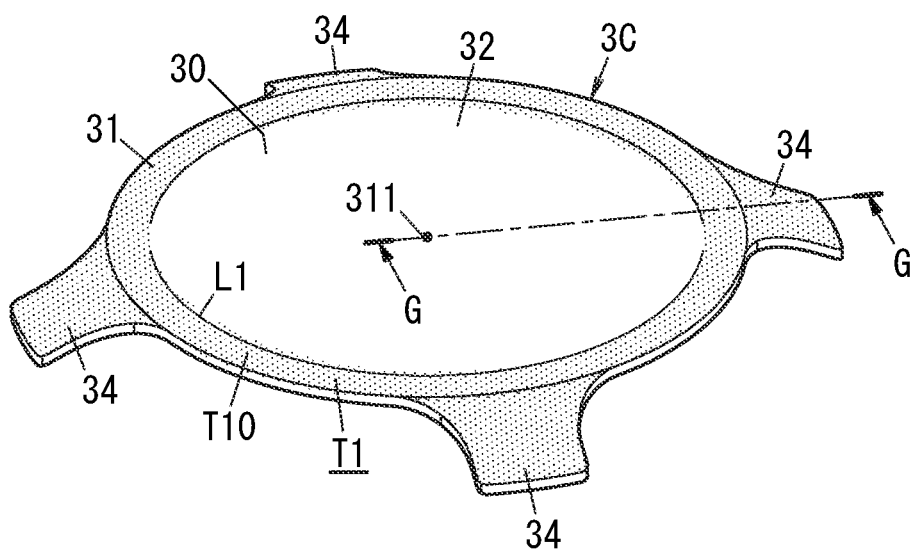
FIG. 12A is a perspective view of another movable member of the second variation.
Figure 12B:
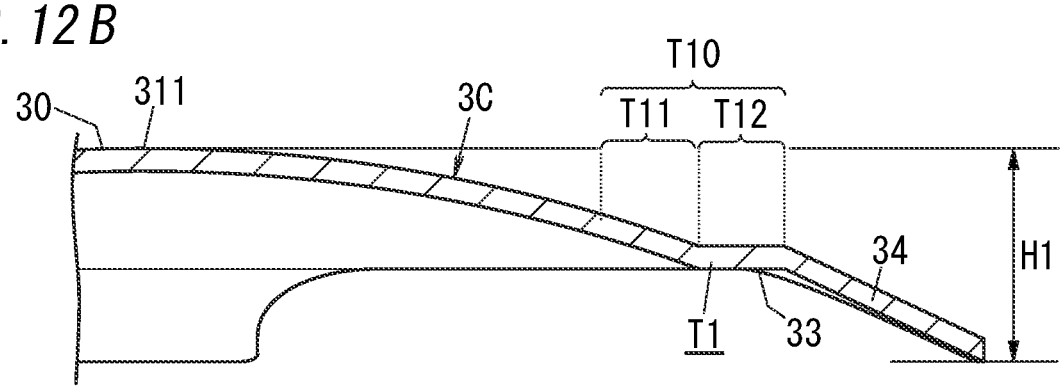
FIG. 12B is a sectional view of a main part of the other movable member.

Incidentally, the input device 1 of the present variation may include a movable member 3C shown in FIGS. 12A and 12B in place of the movable member 3B. Note that FIG. 12B is a sectional view along line G-G of FIG. 12A.

The movable member 3C is also formed as a metal dome having a substantially round shape with four legs (substantially throwing star shape) as a whole and has a press surface 30, a center part 32 having a substantially circular plate-like shape, and an outer peripheral part 31 surrounding an outer edge of the center part 32. In FIG. 12A, in order to facilitate understanding of the explanation, the surface of the outer peripheral part 31 is expediently shaded with dots, but shading is not to precisely define the area of the outer peripheral part 31. The outer peripheral part 31 has four leg sections 34 protruding outward. The outer peripheral part 31 of the movable member 3C includes a suppression structure T1 configured to suppress the movable member 3C from being elastically deformed by pressing force.

The suppression structure T1 of the movable member 3C is provided to the entirety of the movable member 3C in the circumferential direction when viewed along the pressing direction D1. The suppression structure T1 includes one bent part T10 bent along a fold line L1. The fold line L1 is a circular line when viewed along the pressing direction D1. The bent part T10 included in the outer peripheral part 31 is provided not at the four leg sections 34 but on an inner side of the leg section 34.

The bent part T10 of the movable member 3C has a base part T11 being substantially annular and a substantially annular folded part T12 disposed on an outer side of the base part T11. The base part T11 has a surface which is a gently curved surface continuous with a surface (curved surface) of the center part 32. The folded part T12 has both flat surfaces in the thickness direction thereof and is plate-shaped. The folded part T12 is (substantially) parallel to the surface of the fixed electrode 7.

Each leg section 34 protrudes from an outer edge of the folded part T12 to be tilted relative to the folded part T12. Each leg section 34 is gently tilted outward toward the fixed electrode 7 in a substantially similar manner to the leg section 34 of the movable member 3Z.

The movable member 3C also includes the suppression structure T1, and therefore, dimensionally designing the movable member 3C with a smaller height H1 than the height H2 (see FIG. 11B) of the movable member 3Z (reducing the height) enables the movable member 3C to be deformed with pressing force substantially equal to the pressing force required for the movable member 3Z. In other words, downsizing is possible while the magnitude of the required pressing force is maintained.

In particular, the movable member 3C includes the suppression structure T1 provided to the entirety of the movable member 3C in the circumferential direction, and therefore, the required pressing force can be increased compared to the movable member 3B, and by adjusting the height of the center part 32, downsizing can be achieved while the magnitude of the required pressing force is maintained.

Figure 13A:
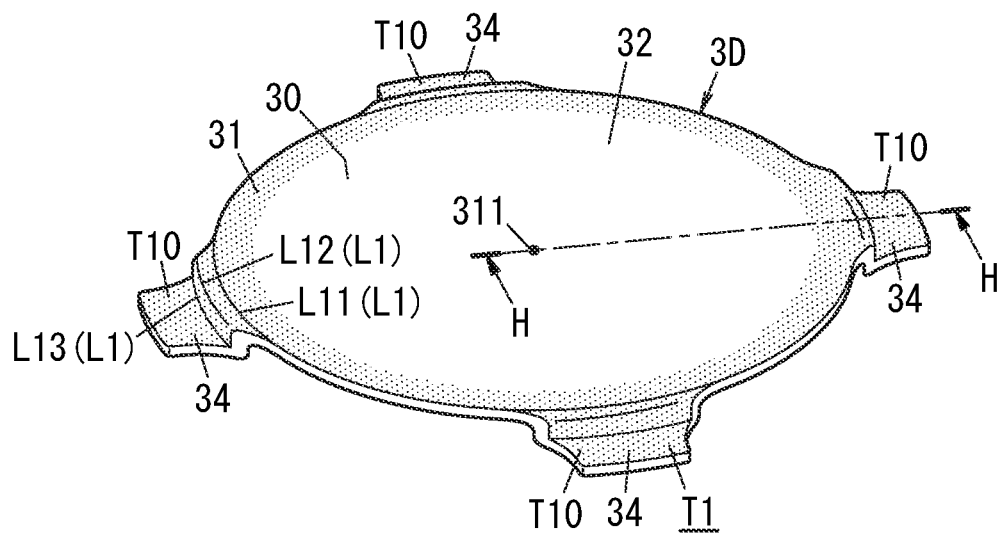
FIG. 13A is a perspective view of still another movable member of the second variation.
Figure 13B:
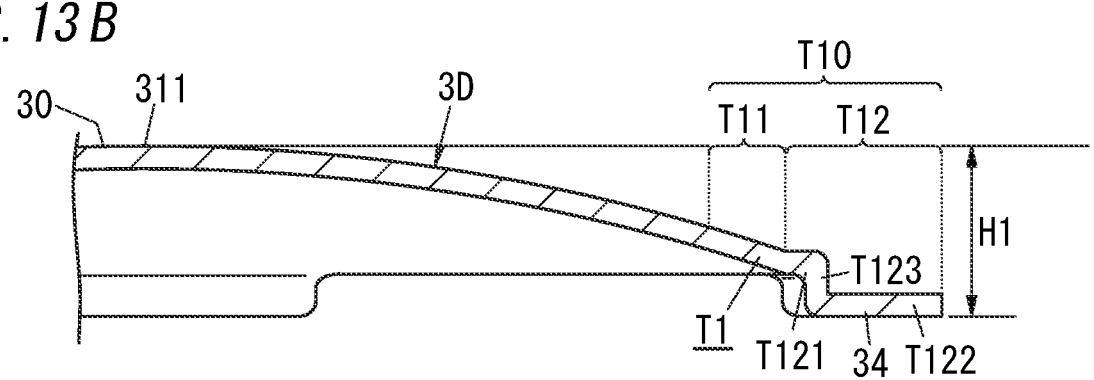
FIG. 13B is a sectional view of a main part of the still another movable member.

Moreover, the input device 1 of the present variation may include a movable member 3D shown in FIGS. 13A and 13B in place of the movable member 3B. FIG. 13B is a sectional view along line H-H of FIG. 13A.

The movable member 3D is formed as a metal dome having a substantially round shape with four legs (substantially throwing star shape) as a whole and has a press surface 30, a center part 32 having a substantially circular plate-like shape, and an outer peripheral part 31 surrounding an outer edge of the center part 32. In FIG. 13A, in order to facilitate understanding of the explanation, the surface of the outer peripheral part 31 is expediently shaded with dots, but shading is not to precisely define the area of the outer peripheral part 31. The outer peripheral part 31 has four leg sections 34 protruding outward. The four leg sections 34 are arranged at substantially equal intervals along the circumferential direction of the movable member 3D when viewed along the pressing direction D1.

The outer peripheral part 31 of the movable member 3D includes a suppression structure T1 configured to suppress the movable member 3D from being elastically deformed by pressing force. The suppression structure T1 of the movable member 3D is provided to part of the movable member 3D in a circumferential direction of the movable member 3D when viewed along the pressing direction D1. Specifically, the suppression structure T1 of the movable member 3D includes four bent parts T10 each stepwise bent along three fold lines L1. Each fold line L1 is a circularly arc-shaped line when viewed along the pressing direction D1. The four bent parts T10 are provided to the respective four leg sections 34. The three fold lines L1 are referred to as a first fold line L11, a second fold line L12, and a third fold line L13 in this order from the inside.

Each bent part T10 of the movable member 3D includes a base part T11 and a folded part T12. The base part T11 has a surface which is a gently curved surface continuous with a surface (curved surface) of the center part 32. The folded part T12 has a step-like cross section as shown in FIG. 13B and has: two parts (a first part T121 and a second part T122) each of which has both flat surfaces in the thickness direction of the folded part T12; and a connection part T123 connecting the two parts.

The first part T121 is continuous with the base part T11, is bent along the first fold line L11 relative to the base part T11, and is (substantially) parallel to the surface of the fixed electrode 7. The first part T121 is elongated and has a curved and substantially rectangular plate shape when viewed along the pressing direction D1.

The connection part T123 is continuous with the outer edge of the first part T121 and is bent downward along the second fold line L12 at a substantially right angle.

The second part T122 is continuous with the lower edge of the connection part T123, is bent along the third fold line L13 relative to the connection part T123, and is (substantially) parallel to the surface of the fixed electrode 7. The second part T122 has a substantially trapezoidal plate shape when viewed along the pressing direction D1. That is, the second part T122 is on an outer side of the first part T121. The outward projection amount of the second part T122 is larger than that of the first part T121.

The movable member 3D also includes the suppression structure T1, and therefore, dimensionally designing the movable member 3D with a smaller height H1 than the height H2 (see FIG. 11B) of the movable member 3Z (reducing the height) enables the movable member 3D to be deformed with pressing force substantially equal to the pressing force required for the movable member 3Z. In other words, downsizing is possible while the magnitude of the required pressing force is maintained.

(3.3) Other Variations

Figure 14A:
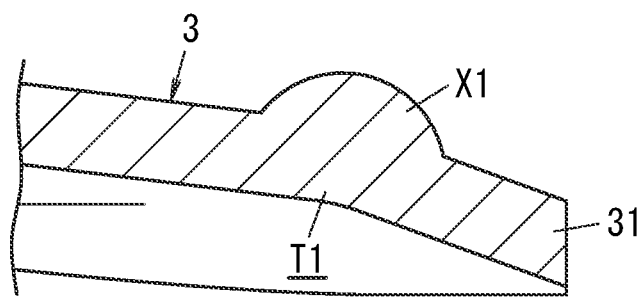
FIGS. 14A to 14C are sectional views of main parts of movable members of other variations of the input device.
Figure 14B:
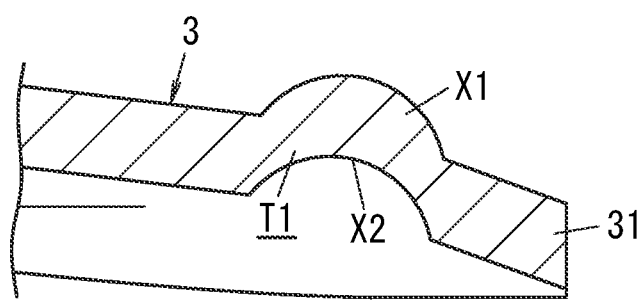

In the basic example, the suppression structure T1 has the bent part T10 bent along the fold line L1. However, the suppression structure T1 may include, alternatively or additionally to the bent part T10, at least one of a projection X1 (see FIG. 14A) protruding relative to the fixed electrode 7 or a groove X2 (see FIG. 14B) recessed relative to the fixed electrode 7. Also in this case, the suppression structure T1 is easily fabricated with a simple configuration. In the example shown in FIG. 14A, the projection X1 is provided on an upper surface near the outer edge of the outer peripheral part 31 of the movable member 3 but may be provided on the lower surface of the outer peripheral part 31. The number of projections X1 is not particularly limited. In the example shown in FIG. 14B, the groove X2 is provided on a back side of the projection X1 of FIG. 14A, but the projection X1 may be omitted. The number of grooves X2 is not particularly limited. Alternatively, the groove X2 may be provided on the upper surface of the outer peripheral part 31.

Figure 14C:
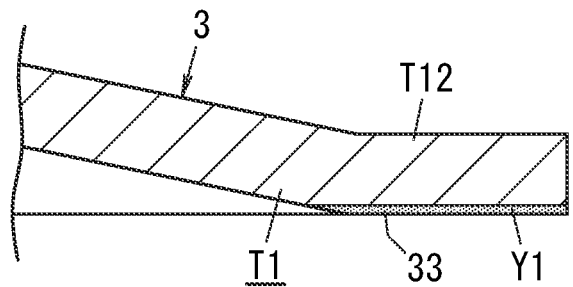

In the basic example, the suppression structure T1 is a structure that improves the stiffness of the movable member 3 as a whole by the bent part T10, thereby suppressing elastic deformation caused by the pressing force. However, the suppression structure T1 may include a high frictional structure Y1 (see FIG. 14C) which increases frictional resistance such that the elastic deformation caused by the pressing force is suppressed. Also in this case, the suppression structure T1 is easily fabricated with a simple configuration. In the example shown in FIG. 14C, the high frictional structure Y1 is provided on the counter surface 33 of the folded part T12, but a part where the high frictional structure Y1 is provided is not particularly limited as long as the part comes into contact with the movable electrode 6. The high frictional structure Y1 has higher frictional resistance than the other surface areas of the movable member 3 (areas other than the counter surface 33). The high frictional structure Y1 may be fabricated by forming an uneven structure on a surface by, for example, a knurling process. Alternatively, the high frictional structure Y1 may be fabricated by affixing of a thin film member having an uneven structure or by applying a liquid agent.

In the basic example, the description is given with the base part TI1 and the center part 32 being distinguished from each other, but the base part T11 may correspond to part of the center part 32.

In the basic example, an insulating elastic body which is electrically insulating may be provided in place of the elastic body 14 (conductive elastic body). In this case, the insulating elastic body preferably has relatively high permittivity as in the case of for example, dielectric elastomer. When the insulating elastic body is provided in place of the conductive elastic body, the insulating sheet 15 may be omitted.

(4) Summary

As described above, an input device (1) of a first aspect includes a fixed electrode (7), a movable electrode (6), and a movable member (3, 3A to 3D). The movable member (3, 3A to 3D) is configured to elastically deform by receiving pressing force to relatively displace the movable electrode (6) toward the fixed electrode (7). The movable member (3, 3A to 3D) has an outer peripheral part (31). The outer peripheral part (31) includes a suppression structure (T1) configured to suppress the movable member (3, 3A to 3D) from being elastically deformed by the pressing force. With the first aspect, downsizing is possible while the magnitude of the required pressing force is maintained.

In an input device (1) of a second aspect referring to the first aspect, the suppression structure (T1) is provided to part of the movable member (3, 3B to 3D) in a circumferential direction of the movable member (3, 3B to 3D) when viewed along a pressing direction (D1) of the pressing force. With the second aspect, cost relating to formation of the suppression structure (T1) can be reduced more than in the case where the suppression structure (T1) is provided to the entirety of the movable member (3, 3B to 3D) in the circumferential direction.

In an input device (1) according to a third aspect referring to the second aspect, the movable member (3) has a shape elongated in one direction when viewed along the pressing direction (D1) of the pressing force. The suppression structure (T1) is provided at both ends (a first end 301 and a second end 302) of the movable member (3) in the one direction. With the third aspect, the elastic deformation can be more stably suppressed while cost relating to formation of the suppression structure (T1) is reduced.

In an input device (1) according to a fourth aspect referring to any one of the first to third aspects, the suppression structure (T1) has a bent part (T10) bent along a fold line (L1). With the fourth aspect, the suppression structure (T1) is easily fabricated with a simple configuration.

In an input device (1) according to a fifth aspect referring to the fourth aspect, the bent part (T10) has a base part (T11) and a folded part (T12). The base part (T11) is provided on an inner side of the fold line (L1) when viewed along the pressing direction (D1) of the pressing force. The folded part (T12) is provided on an outer side of the fold line (L1) and is folded relative to the base part (T11) when viewed along the pressing direction (D1) of the pressing force. The folded part (T12) is along a surface of the fixed electrode (7). With the fifth aspect, more effective downsizing is possible.

In an input device (1) according to a sixth aspect referring to the fifth aspect, the folded part (T12) is parallel to the surface of the fixed electrode (7). With the sixth aspect, more effective downsizing is possible.

In an input device (1) according to a seventh aspect referring to any one of the first to sixth aspects, the suppression structure (T1) has at least one of a projection (X1) protruding relative to the fixed electrode (7) or a groove (X2) recessed relative to the fixed electrode (7). With the seventh aspect, the suppression structure (T1) is easily fabricated with a simple configuration.

In an input device (1) according to an eighth aspect referring to any one of the first to seventh aspects, the suppression structure (T1) has a high frictional structure (Y1) which increases frictional resistance to suppress the movable member from being elastically deformed by the pressing force. With the eighth aspect, the suppression structure (T1) is easily fabricated with a simple configuration.

Note that the constituent elements of the second to eighth aspects are not essential constituent elements for the input device (1) but may be omitted as appropriate.

REFERENCE SIGNS LIST

1 Input Device
3, 3A To 3D Movable Member
31 Outer Peripheral Part
6 Movable Electrode 7 Fixed Electrode
D1 Pressing Direction
L1 Fold Line
T1 Suppression Structure
T10 Bent Part
T11 Base Part
T12 Folded Part
X1 Projection
X2 Groove
Y1 High Frictional Structure

The invention claimed is:

1. An input device, comprising:
a fixed electrode;
a movable electrode having a plate shape, the movable electrode having a hole penetrating its central part in a thickness direction thereof; and
a movable member configured to elastically deform by receiving pressing force to relatively displace the movable electrode toward the fixed electrode, wherein:
the movable member includes a summit part configured to pass through the hole of the movable electrode and approach a part of the fixed electrode, when the movable member is elastically deformed by receiving the pressing force, and
the movable member includes an outer peripheral part, and the outer peripheral part includes a suppression structure configured to suppress the movable member from being elastically deformed by the pressing force.

2. The input device of claim 1, wherein
the suppression structure is provided to part of the movable member in a circumferential direction of the movable member when viewed along a pressing direction of the pressing force.

3. The input device of claim 2, wherein
the movable member has a shape elongated in one direction when viewed along the pressing direction of the pressing force, and
the suppression structure is provided at both ends of the movable member in the one direction.

4. The input device of claim 1, wherein
the suppression structure has a bent part bent along a fold line.

5. The input device of claim 4, wherein
the bent part has
a base part provided on an inner side of the fold line when viewed along the pressing direction of the pressing force and
a folded part provided on an outer side of the fold line and folded relative to the base part when viewed along the pressing direction of the pressing force, and
the folded part is along a surface of the fixed electrode.

6. The input device of claim 5, wherein
the folded part is parallel to the surface of the fixed electrode.

7. The input device of claim 1, wherein
the suppression structure has at least one of a projection protruding relative to the fixed electrode or a groove recessed relative to the fixed electrode.

8. The input device of claim 1, wherein
the suppression structure includes a high frictional structure which increases frictional resistance to suppress the movable member from being elastically deformed by the pressing force.

9. The input device of claim 2, wherein
the suppression structure has a bent part bent along a fold line.

10. The input device of claim 3, wherein
the suppression structure has a bent part bent along a fold line.

11. The input device of claim 9, wherein
the bent part has
a base part provided on an inner side of the fold line when viewed along the pressing direction of the pressing force and
a folded part provided on an outer side of the fold line and folded relative to the base part when viewed along the pressing direction of the pressing force, and
the folded part is along a surface of the fixed electrode.

12. The input device of claim 10, wherein
the bent part has
a base part provided on an inner side of the fold line when viewed along the pressing direction of the pressing force and
a folded part provided on an outer side of the fold line and folded relative to the base part when viewed along the pressing direction of the pressing force, and
the folded part is along a surface of the fixed electrode.

13. The input device of claim 11, wherein
the folded part is parallel to the surface of the fixed electrode.

14. The input device of claim 12, wherein
the folded part is parallel to the surface of the fixed electrode.

* * * * *